United States Patent [19]

Lee et al.

[11] Patent Number: 5,467,439
[45] Date of Patent: Nov. 14, 1995

[54] INTERPOLATION METHOD OF DIGITAL IMAGE DATA AND A CIRCUIT THEREFOR

[75] Inventors: Seong-won Lee; Joon-ki Paik, both of Seoul, Rep. of Korea

[73] Assignee: Samsung Electronics Co., Ltd., Kyungki-do, Rep. of Korea

[21] Appl. No.: 181,384

[22] Filed: Jan. 14, 1994

[30] Foreign Application Priority Data

Jan. 14, 1993 [KR] Rep. of Korea .......................... 93-419

[51] Int. Cl.⁶ ................................................ G06F 15/62
[52] U.S. Cl. ................................................ 395/133
[58] Field of Search ........................... 395/133; 382/16, 382/31, 54, 55; 345/136, 137, 138

[56] References Cited

U.S. PATENT DOCUMENTS 5,325,470 6/1994 Sumino et al. ........................ 395/121
5,325,476 6/1994 Takii et al. ........................... 395/141

Primary Examiner—Phu K. Nguyen
Attorney, Agent, or Firm—Sughrue, Mion, Zinn, Macpeak & Seas

[57] ABSTRACT

A method of interpolating digital image data includes steps for calculating an absolute value of the difference between two neighboring pixels of image data, among four neighboring pixels of image data, determining maximum and second-most maximum values among the thus-calculated absolute values and interpolating the image data using the results. An interpolation circuit for performing above-described method includes an edge detector, a pre-filter, a zero-order interpolation area controller, a zero-order interpolator, a movement averaging device, a magnification factor controller and a post-filter.

8 Claims, 4 Drawing Sheets

INTERPOLATION METHOD OF DIGITAL IMAGE DATA AND A CIRCUIT THEREFOR

BACKGROUND OF THE INVENTION

1. Field of the Invention

The present invention relates to a method of processing digital image data which represents a physical image. More particularly, the invention relates to a method of interpolating the digital image data. A circuit for implementing the novel method is also disclosed.

Korean Patent Application No. 93-419 is incorporated by reference for all purposes.

2. Description of the Related Art

The conventional technique for interpolating digital image data which represents a physical image uses a method based on a nearest-neighbor interpolation (NNI). This NNI method, regardless of the edge information and the correlation between surrounding pixels, directly interpolates the digital image data by the value of the nearest neighboring pixel. Then, a movement filter is repeatedly used for the image which has been interpolated by the NNI method to produce a family interpolated and expanded image. It should be noted the NNI method does not greatly influence the quality of a picture with a low magnification factor but produces large, rectangular blocks in highly magnified images. Moreover, this blocking, or mosaic phenomena, produced in the later case, can be removed by means of a movement averaging filter. For higher magnifications, however, a greater number of repetitions of the movement-averaging filtering becomes necessary and, if these repetitions are too numerous, the smoothness is over-emphasized, which causes a distinct degradation in the contrast of the image. This is because the conventional technique exhibits a diagonal smoothness which is poorer than that of the horizontal or vertical directions. The manner in which the diagonal interpolation is affected is described below, in terms of the conventional image interpolation technique 01.

FIG. 1 shows the supporting region of the zero-order interpolated image of the conventional technique, in the case of a magnification factor of two. Here, $x(i,j)$ denotes the strength of the $(i,j)$th pixel of the image and is movement-averaged in the horizontal direction, which results in equations (1a) through (1d).

$$y_h(i,j) = \tfrac{1}{2}\{x(i,j) + x(i+1,j)\} \quad (1a)$$

$$y_h(i+1,j) = \tfrac{1}{2}\{x(i+1,j) + x(i+2,j)\} \quad (1b)$$

$$y_h(i,j+1) = \tfrac{1}{2}\{x(i,j+1) + (i+1,j+1)\} \quad (1c)$$

$$y_h(i+1,j+1) = \tfrac{1}{2}\{x(i+1,j+1) + x(i+2,j+1)\} \quad (1d)$$

wherein $y_h(i,j)$ denotes the magnitude of x components after movement-averaging in the horizontal direction.

Next, the x components are again movement-averaged in the vertical direction, using the above equations and thereby obtaining equations (2a) through (2d).

$$\begin{aligned}
y(i,j) &= \tfrac{1}{2}\{y_h(i,j) + y_h(i,j+1)\} \quad (2a)\\
&= \tfrac{1}{4}\{x(i,j) + x(i+1,j) + x(i,j+1) + x(i+1,j+1)\}
\end{aligned}$$

$$\begin{aligned}
y(i+1,j) &= \tfrac{1}{2}\{y_h(i+1,j) + y_h(i+1,j+1)\} \quad (2b)\\
&= \tfrac{1}{4}\{x(i+1,j) + x(i+2,j) + x(i+1,j+1) + x(i+2,j+1)\}
\end{aligned}$$

$$\begin{aligned}
y(i,j+1) &= \tfrac{1}{2}\{y_h(i,j+1) + y_h(i,j+2)\} \quad (2c)\\
&= \tfrac{1}{4}\{x(i,j+1) + x(i+1,j+1) + x(i,j+2) + x(i+1,j+2)\}
\end{aligned}$$

$$\begin{aligned}
y(i+1,j+1) &= \tfrac{1}{2}\{y_h(i+1,j+1) + y_h(i+1,j+2)\} \quad (2d)\\
&= \tfrac{1}{4}\{x(i+1,j+1) + x(i+2,j+1) + x(i+1,j+2) + x(i+2,j+2)\}
\end{aligned}$$

It should be noted that, in the above equations, only one common component $x(i+1,j+1)$ exists between the pixel $y(i,j)$ and the diagonally neighboring pixel $y(i+1,j+1)$. On the other hand, two common components exist between horizontally or vertically neighboring pixels. The difference in the number of common components in different directions (i.e., the horizontal/vertical direction versus diagonally) does not satisfy the symmetry of direction in two-dimensional image data. This directional asymmetry causes the mosaic phenomenon.

To explain why the mosaic phenomenon occurs, simple image data can be taken as an example. FIG. 2 shows image data containing the edge of an image in the diagonal direction. Here, it is assumed that the magnitude of pixel a is much greater than that of pixel b. FIG. 3 shows the result produced by twice-zero-order interpolating the image encompassed by the dotted lines of FIG. 2, using the NNI method.

FIG. 4 shows the result of movement-averaging the image of FIG. 3, in the horizontal/vertical direction. In FIG. 4, the values of $y(i+2,j)$, $y(i+1,j+1)$ and $y(i,j+2)$ become 4b, a+3b and 4b, respectively. Therefore, when a is much greater than b, a+3b becomes much greater than 4b, so that the diagonally formed edge collapses. Moreover, the slope of the edge is changed by the collapsed the edge and, thus, the mosaic phenomenon occurs.

SUMMARY OF THE INVENTION

Therefore, the object of the present invention is to provide a digital zero-order interpolation method, which eliminates the blocking of the edge region and the mosaic phenomena which are caused by zero-order interpolation, and reduces the required order of the averaging filter to prevent a degradation in the contrast of a digitally formed and interpolated image.

Another object of the present invention is to provide a zero-order interpolation circuit which accomplishes the above-mentioned method.

The digital zero-order interpolation method of the present invention includes steps for calculating the absolute value of the difference between two neighboring pixel values, among four neighboring pixels of image data, and then determining the maximum and second-most maximum values of the thus-calculated absolute value and for performing an interpolation over the image data, using the results from the calculating step, in accordance with the edge formation of the aforementioned four neighboring pixels.

A digital zero-order interpolating circuit of the present invention, for accomplishing the other object aforementioned, consists of an edge detector for receiving the image data and detecting the edge therefrom, a pre-filter for receiving the image data and then high-pass-filtering the data, a zero-order area interpolating device for receiving the output signal from the edge detection and the difference absolute values, and determining the edge form of the data, which thereby determines the interpolation values for the four neighboring pixels, a zero-order interpolating device for receiving the output signal of the zero-order area interpolating device and then interpolating the prefiltered image data into the corresponding region, a movement-averaging device for receiving the zero-order-interpolated signal and enhancing its smoothness, a magnification factor controller for sending the magnification factor to the zero-order interpolation area device, the zero-order interpolating device and the movement average and a post-filter for low-pass filtering the output image data from the movement-averaging device.

BRIEF DESCRIPTION OF THE DRAWINGS

These and other objects, features, aspects and advantages of the present invention will become more apparent from the following detailed description of the preferred embodiment when taken in conjunction with the accompanying drawings, in which.

DETAILED DESCRIPTION OF THE PREFERRED EMBODIMENT

A digital image interpolation method and the circuit therefor according to a preferred embodiment is described hereinbelow with reference to the attached drawings.

Figure 1:
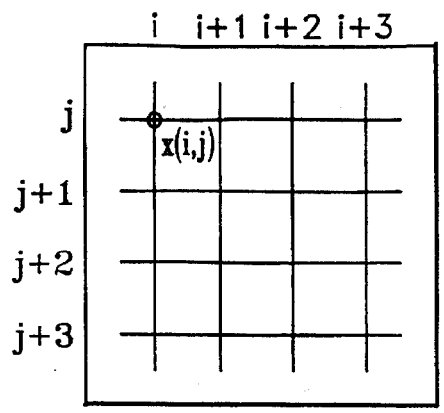
FIG. 1 shows a supporting domain of the zero-order-interpolated image.
Figure 2:
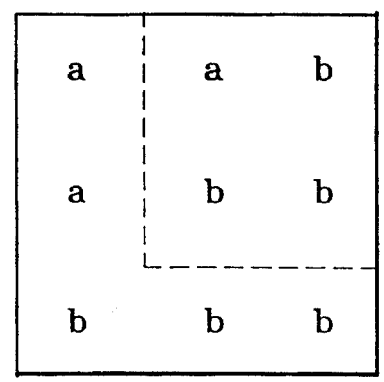
FIG. 2 shows image data having a diagonally formed edge.
Figure 3:
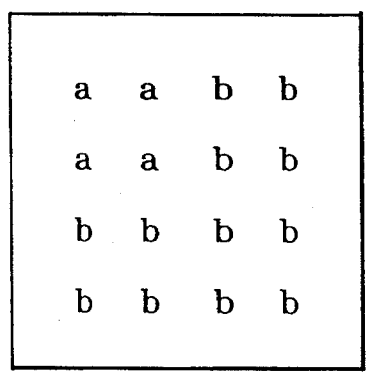
FIG. 3 shows image data which is zero-order-interpolated by the NNI method.
Figure 4:
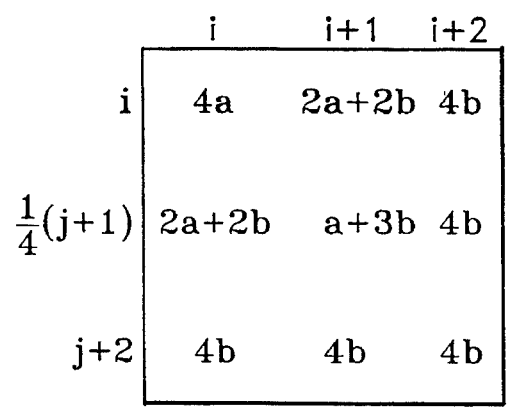
FIG. 4 shows image data resulting from the horizontal/vertical movement-averaging of the NNI method.
Figure 5:
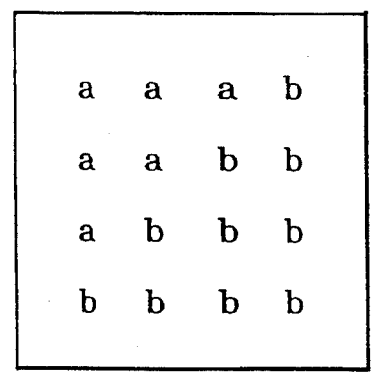
FIG. 5 shows image data which is zero-order-interpolated, with the edge thereof conserved.

In the method of interpolating the digital image signal which represents an image, the image data is movement-average and the edge data is interpolated. FIG. 5 shows image data in which the edge is interpolated, while FIG. 6 shows image data which is movement-averaged from the image data of FIG. 5.

Figure 6:
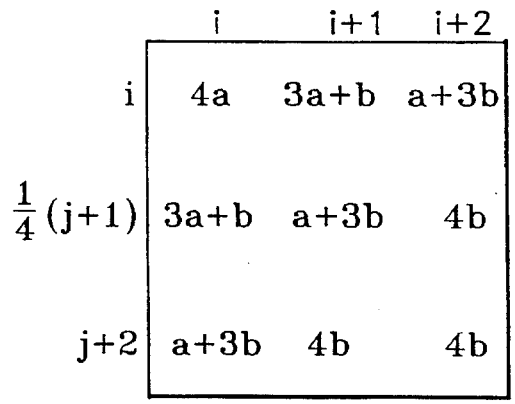
FIG. 6 shows image data resulting from horizontal/vertical movement-averaging, with the edge conserved.

In FIG. 6, diagonal components, i.e., y(i+2,j), y(i+1,j+1) and y(i,j+2) are movement-averaged, to show the edge-forms to be kept absolutely intact as a+3b and the slope of the edge which is also to be preserved. The present invention relates to a zero-order interpolation method which can extract the edge-information of image data representing an image and thus maintain the edge-form of a resulting interpolated image.

Figure 7:
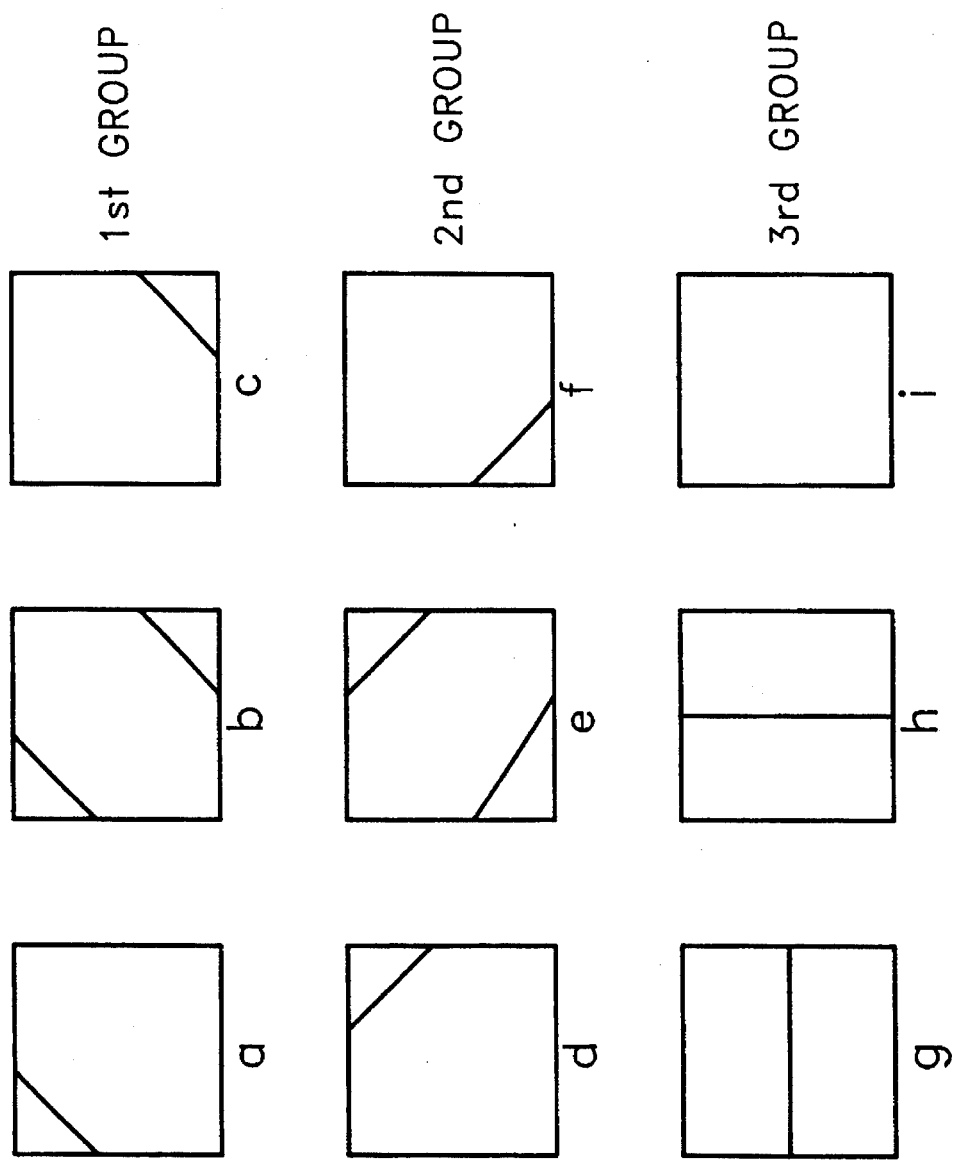
FIG. 7 classifies various forms of the edges into the three groups, by considering four neighboring pixels.

FIG. 7 shows nine patterns which can be taken by an edge-form, and which can be determined using four neighboring pixels. All edges are classified into three groups according to their forms.

Figure 8:
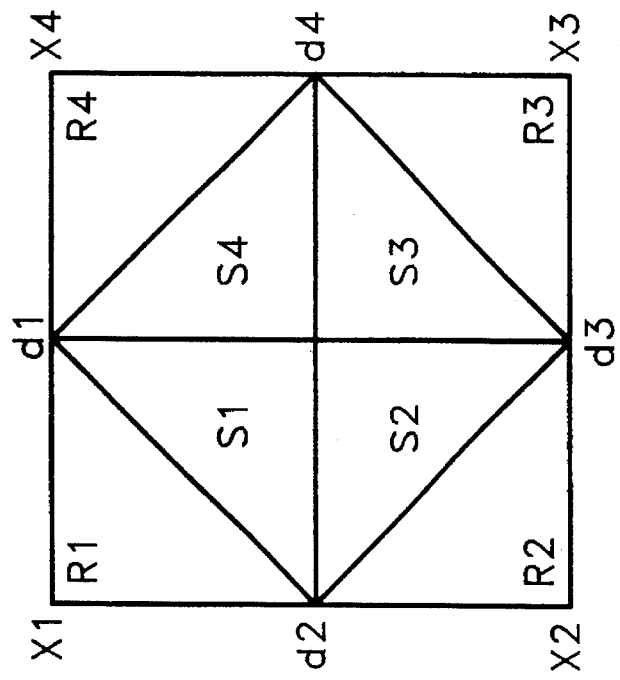
FIG. 8 shows a supporting region of the image, which would be adaptively interpolated in a zero-order method.

FIG. 8 shows a supporting region of the image, to be adaptively zero-order-interpolated. In FIG. 8, the edge information is deducted from the absolute value of the difference between neighboring pixel data, and X1 through X4 denote the magnitudes of the image data at four neighboring pixels. Here, $d_1$, $d_2$, $d_3$ and $d_4$ are determined as follows:

$d_1=|X4-X1|$ $d_2=|X1-X2|$ $d_3=|X2-X3|$ $d_4=|X3-X4|$

The four values ($d_1$, $d_2$, $d_3$ and $d_4$) of the above equations are compared with one another, thus determining a maximum value $d_{max}$ and a second-most maximum value $d_{smx}$, and from these values ($d_{max}$ and $d_{smx}$), the edge form is detected. For example, if $d_1$ is $d_{max}$ and $d_2$ is $d_{smx}$, the edge formed corresponds to either pattern a or b of FIG. 7, but when $d_3$ is $d_{max}$ and $d_4$ is $d_{smx}$, the edge formed corresponds to either pattern b or c. Likewise, if the $d_{max}$ and $d_{smx}$ values are $d_1$ and $d_2$ (or $d_3$ and $d_4$), respectively, the edge is shaped into one of the forms of group 1. Accordingly, if the $d_{max}$ and $d_{smx}$ values are $d_1$ and $d_4$ (or $d_2$ and $d_3$), respectively, the edge is shaped into one of the forms (pattern d, e or f) of group 2, and if the $d_{max}$ and $d_{smx}$ values are $d_1$ and $d_3$ (or $d_2$ and $d_4$), respectively, the edge is shaped into one of the forms (pattern g, h or i) of group 3. Once the edge-form is decided, the image data can be interpolated.

Interpolation is carried out, as shown in FIG. 8, through the areas of R1 to R4, and S1 to S4, which are defined by dividing the whole region to be interpolated by connecting $d_1$, $d_2$, $d_3$ and $d_4$ with lines as shown in FIG. 8. Firstly, outer areas R1, R2, R3 and R4 are set to the values of X1, X2, X3 and X4 respectively, which are magnitude values of the closest pixels. Inner areas S1 through S4 are then substituted by the different values according to the edge-form determined based on $d_{min}$ and $d_{max}$ as noted above.

Figure 9:
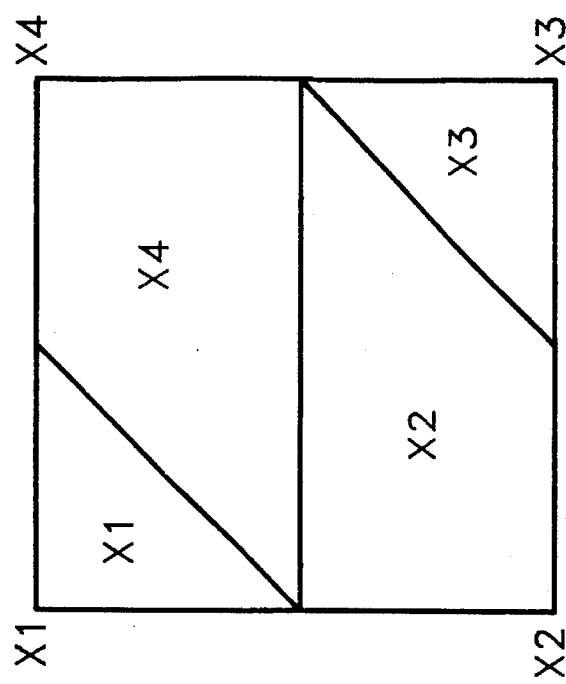
FIG. 9 shows the results of the interpolation, according to a preferred embodiment.

FIG. 9 shows the results of interpolation in the case of $d_{max}=d_2$ and $d_{smx}=d_1$. For group 1 edge-forms, the S2 and S4 region are substituted by the values of X2 and X4, respectively. If $d_{smx}=d_1$ (or $d_{smx}=d_3$), S1 is substituted by X4, and S3 by X2, preferably if $d_{smx}=d_2$ (or $d_{smx}=d_4$), S1 is substituted by X2, and S3 by X4, respectively. Furthermore, for group 2 edge forms, S1 and S3 are substituted by X1 and X3, respectively, if $d_{smx}=d_4$ (or $d_{smx}=d_2$), S2 and S4 are substituted by X1 and X3, respectively, if $d_{smx}=d_1$ (or $d_{smx}=d_3$), S2 and S4 are substituted by X3 and X1, respectively. For group 3 edge forms S1, S2, S3 and S4 are substituted by X1, X2, X3 and X4, respectively.

Figure 10:
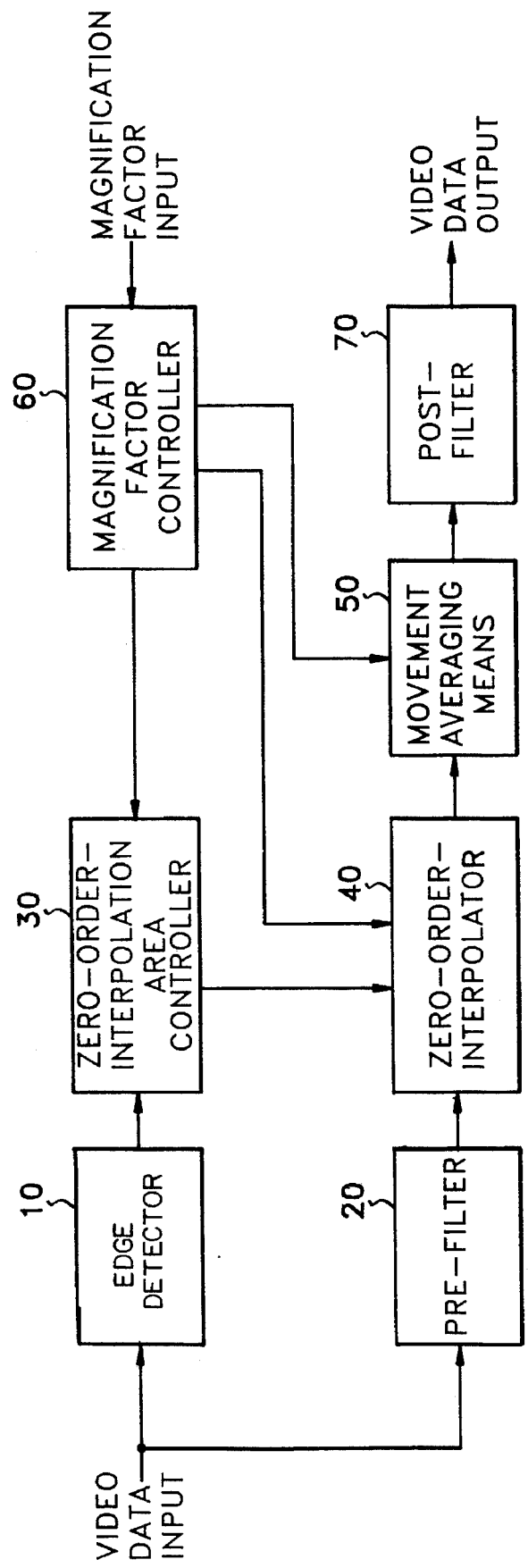
FIG. 10 shows a block diagram of a digital image interpolation circuit, using the digital image interpolation method of the preferred embodiment.

FIG. 10 shows a block diagram of the digital zero-order interpolating circuit according to the preferred embodiment utilizing a digital zero-order interpolation method. The edge of the image data is detected by an edge detector 10 receiving the image data which represents a physical image. A pre-filter 20 high-pass-filters image data which is also input thereto. A zero-order interpolation area controller 30 receives the output from edge detector 10, which includes the absolute value of the difference between neighboring pixel data by which the edge-form is determined, and thus determines interpolating positions for each area with respect to the four neighboring image pixels in the manner discussed above.

A zero-order interpolator 40 receives the output from zero-order interpolation area controller 30, and thereafter interpolates the pre-filtered image data into the corresponding regions in the manner discussed above. A movement averaging circuit 50 receives the zero-order-interpolated signal and enhances the smoothness of the image data. A magnification factor controller 60 sends a magnification factor signal to zero-order interpolation area controller 30, zero-order interpolator 40 and movement averaging circuit 50. Finally, a post-filter 70 low-pass filters the output from movement averaging circuit 50.

Accordingly, the zero-order interpolation method and the circuit therefor, according to the present invention, is able to simplify and classify the edge-forms, so as to zero-order-interpolate the image data with the edge form preserved, using only minimal calculations. This enables an excellent degree of image interpolation in terms a high image quality of the resulting image. Additionally, the method is advantageously simple and can be easily embodied into the hardware equipment. For example, the method can be accomplished by a preprogrammed microprocessor based device or analog circuitry.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method of zero-order interpolating digital image data, said method comprising the steps of:
   (a) calculating the respective absolute values of the difference between two neighboring pixels of image data representing an image, among four neighboring pixels of said image data, and then determining the maximum value and second-most maximum value of said absolute values; and
   (b) interpolating the image data, responsive to the maximum and the second-most maximum values determined in said step (a), according to edge-forms defined by the four neighboring pixels of the image data.

2. The method of zero-order-interpolating the digital image data as claimed in claim 1, wherein said four neighboring pixels of said image data are respectively denoted as first, second, third and fourth pixels counter-clockwise starting from the uppermost left one of the pixels, and wherein said calculating step further comprises the steps of:
   (c) calculating the absolute value of the difference between said fourth and said first pixel values;
   (d) calculating the absolute value of the difference between said first and said second pixel values;
   (e) calculating the absolute value of the difference between said second and said third pixel values;
   (f) calculating the absolute value of the difference between said third and said fourth pixel values; and
   (g) determining the maximum and the second-most maximum values among the absolute values calculated in said steps (c) through (f), respectively.

3. (Amended) The method of zero-order interpolating the digital image data as claimed in claim 2, wherein, the mid-point between the first and the fourth pixels defines a first position, the mid-point between the first and the second pixels defines a second position, the mid-point between the second and the third pixels defines a third position, and the mid-point between the third and the fourth pixels defines a fourth position, and wherein said interpolating step (b) comprises the steps of:
   (h) connecting said first and said third positions to each other with a first line and connecting said second and said fourth positions to each other with a second line so as to divide a region of the image data;
   (i) connecting said first and said second positions, said second and said third positions, said third and said fourth positions, and said fourth and said first positions, respectively, with third through sixth lines thereby dividing said region into eight sections, said sections being denoted as first, second, third and fourth sections counter-clockwise starting from the upper left of the outer portion of the region, and as fifth, sixth, seventh and eighth sections counter-clockwise starting from the upper left of the inner portion of the region;
   (j) substituting said first, second, third and fourth sections with the neighboring image data and processing said fifth, sixth, seventh and eight sections, said processing step comprising:
   (ja) substituting said sixth and said eighth sections with respective values of the second and said fourth pixels, and said fifth and said seventh sections with respective values of the fourth and said second pixels, respectively, when the second-most maximum value is the respective one of the values obtained by one of said calculating steps (d) and (e);
   (jb) substituting said fifth and said seventh sections with the respective values of the second and said fourth pixels, respectively, when the second-most maximum value is the respective one of the values obtained by said calculating steps (d) and (f) steps;
   (jc) substituting said fifth and said seventh sections with the respective values of the first and said third pixels, respectively, and said sixth and said eighth sections with the respective values of the first and the third pixels, respectively, when the second-most maximum value is obtained by said calculating steps (f) and (d);
   (jd) substituting said sixth and said eighth sections with the respective values of the third and the first pixels, respectively, when the second-most maximum value is the respective one of the values obtained by the calculating steps (c) or (e);
   (je) substituting said fifth, said sixth, said seventh and said eighth sections with the respective values of the first, the second, the third and the fourth pixels when the second-most maximum value is obtained in said calculating step (d) or the calculating step (f).

4. A method of interpolating digital image data representing an image, comprising the steps of:
   (a) calculating the absolute value of the difference between two neighboring pixels of the image data among four neighboring pixels of the image data;
   (b) determining the maximum and second-most maximum values among the absolute values calculated by said absolute value calculating step; and
   (c) interpolating the image data based on said values determined in said step (b).

5. The method of interpolating the digital image data as claimed in claim 4, wherein the four neighboring pixels are denoted as first, second, third and fourth pixels, respectively, in a counter-clockwise direction starting from the upper left, and wherein said step (a) comprises the steps of:
   (d) calculating the absolute value of the difference between said fourth and said first pixel values;
   (e) calculating the absolute value of the difference between said first and said second pixel values;

(f) calculating the absolute value of the difference between said second and said third values; and (g) calculating the absolute value of the difference between said third and said fourth pixel values.

6. The method of interpolating the digital image data as claimed in claim 5, wherein said step (b) determines the maximum and second-most maximum values among the values calculated in said steps (d) through (g).

7. The method of interpolating the digital image data as claimed in claim 5, wherein the mid-point between the first and the fourth pixels defines a first position, the mid-point between the second and the first pixels defines a second position, the mid-point between the third and the second pixels defines a third position, and the mid-point between the fourth and the third pixels defines a fourth position, and wherein said step (c) comprises the steps of:

(h) connecting said first and said third positions to each other with a first line and connecting said second and said fourth positions to each other with a second line, so as to divide a respective region of the image data;

(i) connecting said first and said second positions, said second and said third positions, said third and said fourth positions, and said fourth and said first positions, respectively, thereby dividing said region into eight sections, said sections being denoted as first, second, third and fourth sections counter-clockwise starting from the upper left of the outer portion of said region, and as fifth, sixth, seventh and eighth sections counter-clockwise starting from the upper left of the inner portion of said region;

(j) substituting said first, said second, said third and said fourth sections with the neighboring data; and (k) processing said fifth, said sixth, said seventh and said eighth sections, said processing step (k) comprising the steps of:

(ka) substituting said sixth and said eighth sections with the values of the second and the fourth pixels, and said fifth and said seventh sections with the values of the fourth and the second pixels, respectively, when the second-most maximum value is obtained by one of said steps (d) and (f);

(kb) substituting said fifth and said seventh sections with the values of the second and the fourth pixels, respectively, when the second-most maximum value is obtained by one of said steps (e) and (g);

(kc) substituting said fifth and said seventh sections with the values of the first and the third pixels, respectively, and said sixth and eighth sections with the values of the first and third pixels, respectively, when the second-most maximum value is obtained by one of said steps (g) and (e);

(kd) substituting said sixth and said eighth sections with the values of the third and the first pixels, respectively, when the second maximum value is obtained by one of said steps (d) and (f); and (ke) substituting said fifth, said sixth, said seventh and said eighth sections with the values of the first, the second, the third and the fourth pixels, respectively, when the second-most maximum value is obtained in one of said step (e) and step (g).

8. A digital image data interpolating circuit comprising:

edge-detecting means receiving image data which represents an image for detecting an edge included in said image data;

a pre-filter for high-pass filtering said image data thereby generating interpolation data;

zero-order-interpolation area controlling means receiving a respective output from said edge-detecting means for calculating absolute values of respective differences between four neighboring pixels of said image signal and for determining an edge-form of a detected edge, so as to determine interpolation values to be substituted into each of a plurality of sections of a region defined by said four neighboring pixels of said image data;

zero-order interpolating means receiving a respective output from said zero-order-interpolation area controlling means, for substituting the interpolation data, into respective said sections thereby providing a zero-order-interpolated signal;

movement averaging means for enhancing edge smoothness of said zero-order-interpolated signal to produce averaged image data;

magnification factor controlling means for supplying a magnification factor to said zero-order-interpolation area controlling means, said zero-order interpolating means and said movement averaging means; and a post-filter for low-pass-filtering the averaged image data output from said movement averaging means.

* * * * *